US010920630B2

(12) United States Patent
Mori et al.

(10) Patent No.: US 10,920,630 B2
(45) Date of Patent: Feb. 16, 2021

(54) INTERNAL COMBUSTION ENGINE

(71) Applicant: HONDA MOTOR CO., LTD., Tokyo (JP)

(72) Inventors: Kensuke Mori, Wako (JP); Masako Takahashi, Wako (JP); Hiroyuki Tsukagoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/502,192

(22) Filed: Jul. 3, 2019

(65) Prior Publication Data
US 2020/0011218 A1 Jan. 9, 2020

(30) Foreign Application Priority Data

Jul. 6, 2018 (JP) ................................ 2018-129365

(51) Int. Cl.
| | |
|---|---|
| *F01M 13/00* | (2006.01) |
| *F02B 61/06* | (2006.01) |
| *B62M 7/02* | (2006.01) |
| *B62K 21/02* | (2006.01) |
| *B62K 11/04* | (2006.01) |

(52) U.S. Cl.
CPC ......... *F01M 13/0033* (2013.01); *F02B 61/06* (2013.01); *B62K 11/04* (2013.01); *B62K 21/02* (2013.01); *B62M 7/02* (2013.01)

(58) Field of Classification Search
CPC ........ F01M 13/0033; F01M 2013/0038; F02B 61/06; B62M 7/02; B62M 11/04; B62K 21/02; B62K 11/04
See application file for complete search history.

(56) References Cited

FOREIGN PATENT DOCUMENTS

| | | | |
|---|---|---|---|
| JP | H04-365915 | A | 12/1992 |
| JP | 08218842 | A * | 8/1996 |
| JP | H08-218842 | A | 8/1996 |
| JP | 10054219 | A * | 2/1998 |
| JP | H10-54219 | A | 2/1998 |
| JP | 2002-122013 | A | 4/2002 |
| JP | 2002122013 | A * | 4/2002 |
| JP | 2008-308990 | A | 12/2008 |
| JP | 2008308990 | A * | 12/2008 |

OTHER PUBLICATIONS

Office Action dated Dec. 25, 2019 issued over the corresponding Japanese patent application No. 2018-129365.

* cited by examiner

*Primary Examiner* — Jacob M Amick
*Assistant Examiner* — Charles Brauch
(74) *Attorney, Agent, or Firm* — Carrier Blackman & Associates, P.C.; William D. Blackman; Joseph P. Carrier

(57) ABSTRACT

An internal combustion engine includes: an engine main body demarcating a breather chamber that is partitioned from a crank chamber, disposed above the crank chamber, and has an inlet opening opened toward the crank chamber; a multistage transmission housed in the crank chamber and having speed change gear trains that are respectively supported by a pair of transmission shafts and mesh with each other; and a breather passage disposed above the transmission shafts and extending in an up-down direction from the crank chamber to the inlet opening of the breather chamber, the inlet opening being disposed above a half in a height direction of the breather chamber. Accordingly, the internal combustion engine can suppress the entry of splashed oil into the breather chamber more than ever before.

11 Claims, 8 Drawing Sheets

INTERNAL COMBUSTION ENGINE

BACKGROUND OF THE INVENTION

Field of the Invention

The present invention relates to an internal combustion engine including: an engine main body having a crank chamber housing a crankshaft; and a multistage transmission housed in the crank chamber and having speed change gear trains respectively supported by a pair of transmission shafts and meshing with each other.

Description of the Related Art

Japanese Patent Application Laid-open No. 4-365915 discloses an internal combustion engine including an engine main body having a crank chamber housing a crankshaft. The engine main body includes a side cover coupled to a crankcase from the outside in a vehicle width direction. A gear chamber that is continuous upward from the crank chamber and houses a reduction gear train is formed between the crankcase and the side cover. The reduction gear train meshes with a driving gear of a starter motor and a starter driven gear supported by the crankshaft, and transmits power of the starter motor from the starter motor to the crankshaft.

A breather cover is coupled to the side cover of the crankcase from the outside in the vehicle width direction. A breather chamber is formed between the side cover and the breather cover so as to be adjacent to the gear chamber. The breather chamber is connected to the gear chamber through an inlet hole facing the reduction gear train and opening into the gear chamber. The inlet hole of the breather chamber faces the reduction gear train at a short distance. Thus, oil scattered by the reduction gear train easily enters the breather chamber.

SUMMARY OF THE INVENTION

The present invention has been made in view of the above-described actual situation, and it is an object of the present invention to provide an internal combustion engine that can suppress the entry of splashed oil into a breather chamber more than ever before.

According to a first aspect of the present invention, there is provided an internal combustion engine comprising: an engine main body demarcating a crank chamber and a breather chamber, the crank chamber housing a crankshaft and the breather chamber being partitioned from the crank chamber, disposed above the crank chamber and having an inlet opening opening toward the crank chamber; a multistage transmission housed in the crank chamber and having speed change gear trains that are respectively supported by a pair of transmission shafts and mesh with each other; and a breather passage disposed above the transmission shaft and extending in an up-down direction from the crank chamber to the inlet opening of the breather chamber, the inlet opening being disposed above a lower half, in a height direction, of the breather chamber.

According to the first aspect, breathing air enters the inlet opening of the breather chamber through the breather passage extending in an up-down direction according to pressure variations within the crank chamber. Thus, the breathing air is introduced from the inlet opening in a position separated from the transmission shafts, and therefore gas-liquid separation is promoted. The breather chamber is disposed above the multistage transmission, and therefore does not protrude in a horizontal direction, so that a compact internal combustion engine can be realized. The avoidance of such a protrusion can contribute to concentration of a mass toward the center of the internal combustion engine.

According to a second aspect of the present invention, in addition to the first aspect, the breather chamber extends frontward, along a plane orthogonal to a rotation axis of the crankshaft, from a connecting end connected to the breather passage toward a cylinder head disposed below an air cleaner, and is connected to the air cleaner by a breather hose coupled to an outlet end located forwardly of the connecting end.

According to the second aspect, a long path of the breathing air is secured, and the breather hose can be shortened because the outlet end of the breather chamber is close to the air cleaner.

According to a third aspect of the present invention, in addition to the first aspect, the engine main body includes: a ceiling surface that is faced to an outer edge of the speed change gear trains and extends along a horizontal plane, the breather passage being disposed on an outside of one end of the ceiling surface; and a curved surface that is continuous from another end of the ceiling surface and extends downward while curved along the outer edge of the speed change gear trains.

According to the third aspect, the breathing air rises along the curved surface, and flows from the ceiling surface to the breather passage. Thus, the speed change gear trains can efficiently scrape down splashed oil in the breathing air, so that gas-liquid separation can be further promoted.

According to a fourth aspect of the present invention, in addition to the third aspect, the engine main body includes a projecting piece projecting downward from a downstream end of the ceiling surface in a rotational direction of the speed change gear trains.

According to the fourth aspect, the splashed oil scattered from the speed change gear trains during rotation of the speed change gear trains is obstructed by the projecting piece. The entry of the splashed oil into the breather passage can therefore be prevented.

According to a fifth aspect of the present invention, in addition to the first aspect, there is provided the internal combustion engine, further comprising: a shift spindle extending in parallel with a rotation axis of a shift drum and faced to the breather passage.

According to the fifth aspect, the shift spindle is faced to the breather passage, and therefore the entry of the splashed oil into the breather passage can be prevented.

According to a sixth aspect of the present invention, in addition to the first aspect, there is provided the internal combustion engine, further comprising: an oil passage pipe extending in parallel with axes of the transmission shafts and faced to the breather passage.

According to the sixth aspect, the oil passage pipe is faced to the breather passage, and therefore the entry of the splashed oil into the breather passage can be prevented.

According to a seventh aspect of the present invention, in addition to the first aspect, a reduction gear of a starter motor is disposed in the breather chamber.

According to the seventh aspect, the splashed oil is scraped down by the reduction gear within the breather chamber. Thus, gas-liquid separation is promoted, and the reduction gear can be moderately lubricated by the action of the splashed oil.

According to an eighth aspect of the present invention, in addition to the seventh aspect, a gear chamber and a labyrinth chamber are demarcated in the breather chamber, the gear chamber housing the reduction gear, and the labyrinth chamber partitioning, in a form of a labyrinth by a rib, a passage of breathing air reaching the gear chamber from the breather passage.

According to the eighth aspect, on the basis of the action of the labyrinth chamber, gas-liquid separation is promoted within the passage reaching the gear chamber, and the splashed oil passing through the labyrinth chamber can moderately lubricate the reduction gear within the gear chamber.

According to a ninth aspect of the present invention, in addition to the eighth aspect, the engine main body includes a crankcase having: a first partition wall extending along a horizontal plane in a position faced to the outer edge of the speed change gear trains, the first partition wall separating the labyrinth chamber from the crank chamber; and a second partition wall continuous from the first partition wall and extending downward while curved along the outer edge of the speed change gear trains, the second partition wall separating the gear chamber from the crank chamber.

According to the ninth aspect, the gear chamber is separated from the crank chamber by the second partition wall extending downward while curved. Thus, the gear chamber can be disposed in a lower part than the labyrinth chamber, and a large space can be secured for the gear chamber while upward bulging of the gear chamber is suppressed.

According to a tenth aspect of the present invention, in addition to the ninth aspect, a lid member covering the gear chamber and the labyrinth chamber from above is coupled to the crankcase.

According to the tenth aspect, a lid member for the reduction gear functions as the lid member for the whole of the breather chamber. The number of parts can therefore be reduced.

According to an eleventh aspect of the present invention, in addition to the ninth aspect, a rotational speed sensor that detects rotational speed of the transmission shaft is attached to the crankcase at a position separated from the labyrinth chamber in an axial direction of the transmission shaft.

According to the eleventh aspect, the labyrinth chamber and the rotational speed sensor are arranged in the axial direction of the transmission shafts. Thus, space saving can be realized above the crankcase.

According to a twelfth aspect of the present invention, in addition to the first aspect, the breather passage is formed by a side wall of the breather chamber.

According to the twelfth aspect, the breather chamber communicates with the atmosphere. Thus, the temperature of the wall surface of the breather chamber becomes lower than the inside of the crankcase, so that the breathing air adhering to the side wall of the breather chamber liquefies easily.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will hereinafter be described with reference to the accompanying drawings. Here, the upward and downward directions, front and rear, and left and right of a vehicle body are assumed to be defined on the basis of a line of sight of an occupant riding on a two-wheeled motor vehicle.

Figure 1:
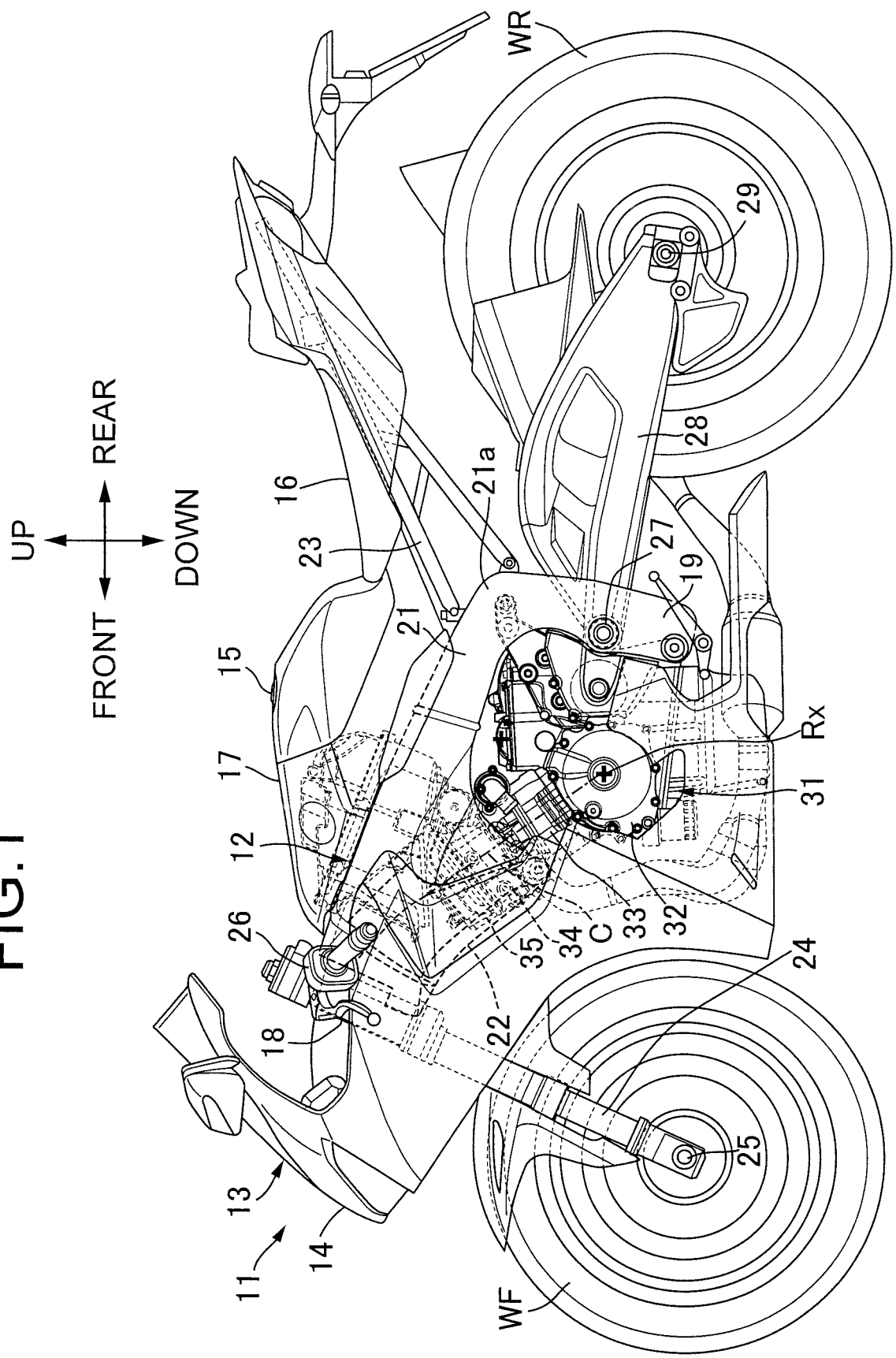
FIG. 1 is a side view schematically depicting a whole configuration of a two-wheeled motor vehicle according to an embodiment.

FIG. 1 schematically depicts an overview of a two-wheeled motor vehicle as a saddle-ridden vehicle according to an embodiment of the present invention. The two-wheeled motor vehicle 11 includes a vehicle body frame 12 and a vehicle body cover 13 fitted to the vehicle body frame 12. The vehicle body cover 13 includes: a front cowl 14 that covers the vehicle body frame 12 from the front; and a tank cover 17 that is continuous in a forward direction from an external surface of a fuel tank 15 and connected to an occupant seat 16 in the rear of the fuel tank 15. A fuel is stored in the fuel tank 15. In driving the two-wheeled motor vehicle 11, the occupant straddles the occupant seat 16.

The vehicle body frame 12 includes: a head pipe 18; a pair of left and right main frames 21 that extend rearwardly downward from the head pipe 18 and have pivot frames 19 at lower rear ends thereof; a down frame 22 that extends downward from the head pipe 18 in a position below the main frames 21 and is integrated with the main frames 21; and left and right seat frames 23 that extend rearwardly upward from curved regions 21a of the main frames 21 and constitute a truss structure. The occupant seat 16 is supported by the seat frames 23.

A front fork 24 is steerably supported by the head pipe 18. A front wheel WF is supported by the front fork 24 so as to be rotatable about an axle 25. Steering handlebars 26 are coupled to an upper end of the front fork 24. A driver grasps grips at the left and right ends of the steering handlebars 26 in driving the two-wheeled motor vehicle 11.

In the rear of the vehicle, a swing arm 28 is coupled to the vehicle body frame 12 so as to be swingable in the up-down direction about a pivot 27. A rear wheel WR is supported by a rear end of the swing arm 28 so as to be rotatable about an axle 29. An internal combustion engine 31 that generates a driving force which is to be transmitted to the rear wheel WR is mounted in the vehicle body frame 12 between the front wheel WF and the rear wheel WR. The power of the internal combustion engine 31 is transmitted to the rear wheel WR through a power transmitting device.

The internal combustion engine 31 includes: a crankcase 32 (as a component of engine main body) disposed between the down frame 22 and the main frames 21 and supported by being coupled to each of the down frame 22 and the main frames 21, the crankcase 32 outputting that outputs the power about a rotation axis Rx; a cylinder block 33 (as a component of engine main body) that is coupled to the crankcase 32 and has a cylinder axis C located in a vertical plane orthogonal to the rotation axis Rx and erected with respect to a horizontal plane; a cylinder head 34 (as a component of engine main body) that is coupled to an upper end of the cylinder block 33 and supports a valve mechanism; and a head cover 35 (as a component of engine main body) that is coupled to an upper end of the cylinder head 34 and covers the valve mechanism on the cylinder head 34.

Figure 2:
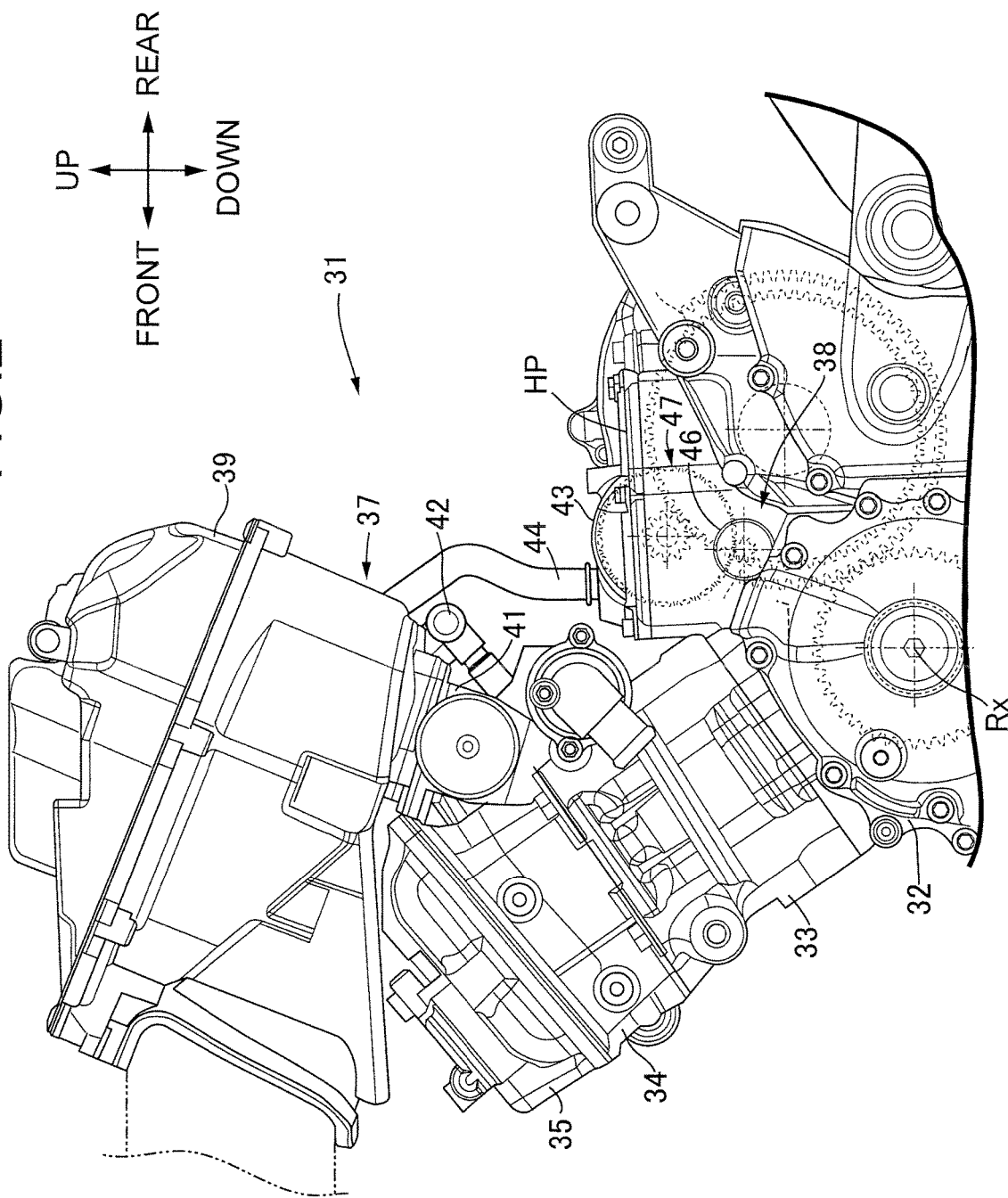
FIG. 2 is an enlarged side view schematically depicting the periphery of an internal combustion engine.

As depicted in FIG. 2, the internal combustion engine 31 includes: an intake device 37 that is connected to the cylinder head 34, and sucks an air from the front of the vehicle and supplies an air-fuel mixture to the cylinder head 34; and a starting device 38 that supplies a driving force to the internal combustion engine 31 before combustion operation at a time of starting the internal combustion engine 31.

The intake device 37 includes: an air cleaner 39 that is connected to the cylinder head 34, and cleans the air sucked from the front of the vehicle; and a throttle body 41 that is connected to the cylinder head 34 and the air cleaner 39, and supplies the cleaned air to the cylinder head 34 while controlling a flow rate by a throttle valve. Attached to the throttle body 41 is a fuel injecting device 42 that produces the air-fuel mixture by injecting a fuel supplied from the fuel tank 15 to flowing air. The cylinder head 34 is disposed below the air cleaner 39.

Coupled to the crankcase 32 is a breather cover 43 (as a component of engine main body and as lid member) that airtightly covers the horizontal surface of the crankcase 32 from above, and demarcates a breather chamber to be described later between the breather cover 43 and the crankcase 32. The breather cover 43 and the air cleaner 39 are connected with a breather hose 44 that supplies breathing air from the breather chamber to a clean room of the air cleaner 39.

The starting device 38 includes: a starter motor 46 disposed at a position shifted from the breather chamber along the rotation axis Rx, and disposed in a valley-shaped space demarcated between the crankcase 32 and the cylinder block 33; and a reduction gear 47 connected to the starter motor 46 and partially disposed within the breather chamber, as will be described later. Details of the starter motor 46 and the reduction gear 47 will be described later.

Figure 3:
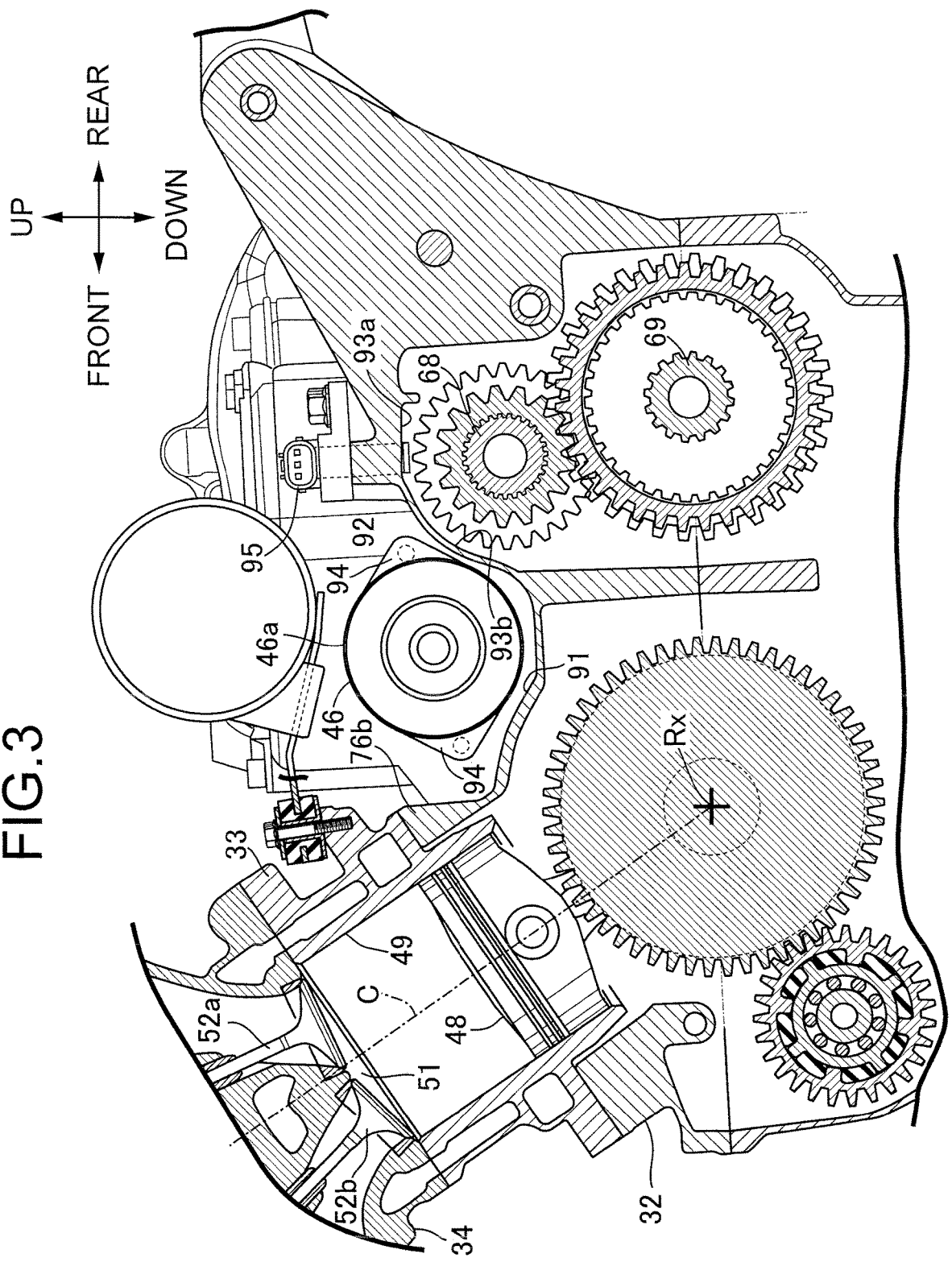
FIG. 3 is an enlarged sectional view schematically depicting a crankcase observed in vertical section and a periphery thereof.

As depicted in FIG. 3, a cylinder 49 that guides a linear reciprocating motion of a piston 48 along the cylinder axis C is formed in the cylinder block 33. In this case, the internal combustion engine 31 is configured to have so-called in-line four cylinders, with four cylinders 49 arranged in the cylinder block 33 along the rotation axis Rx. A combustion chamber 51 is demarcated between the piston 48 and the cylinder head 34. An air-fuel mixture is introduced into the combustion chamber 51 by action of an intake valve 52a and an exhaust valve 52b that are opened and closed according to rotation of a cam shaft. Exhaust gas after combustion is exhausted from the combustion chamber 51.

Figure 4:
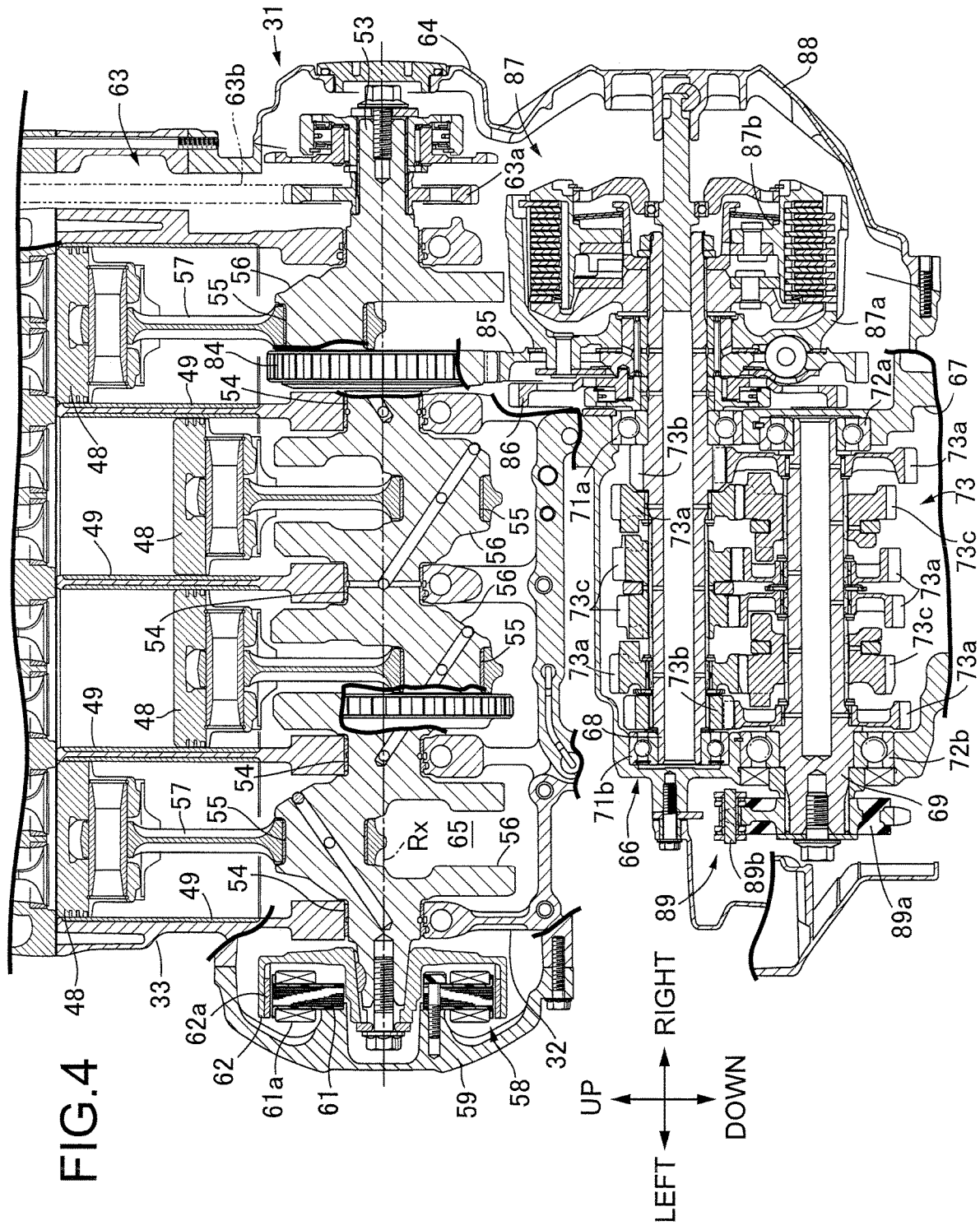
FIG. 4 is an enlarged sectional view of the internal combustion engine, the enlarged sectional view schematically depicting a structure observed in a section including a rotation axis of a crankshaft and the axes of a main shaft and a counter shaft.

As depicted in FIG. 4, a crankshaft 53 is supported by the crankcase 32 so as to be rotatable about the rotation axis Rx. The crankshaft 53 includes: journals 54 coupled to sliding bearings; and a crank 56 that has a crank pin 55 arranged between adjacent journals 54, extending in parallel with the rotation axis Rx, and coupling crank webs to each other. A large end portion of a connecting rod 57 extending from the piston 48 is rotatably coupled to the crank pin 55. The connecting rod 57 converts the linear reciprocating motion of the piston 48 into a rotary motion of the crankshaft 53.

One end of the crankshaft 53 projects to the outside from a left side surface of the crankcase 32. An alternating-current generator (ACG) 58 is connected to the one end of the crankshaft 53. An ACG cover 59 (as a component of engine main body) that houses the ACG 58 between the ACG cover 59 and the crankcase 32 is coupled to the left side surface of the crankcase 32. The ACG 58 includes a stator 61 fixed to the ACG cover 59 and a rotor 52 relatively non-rotatably coupled to the one end of the crankshaft 53 projecting from the crankcase 32. The stator 61 has a plurality of coils 61a arranged in a peripheral direction around the crankshaft 53 and wound around a stator core. The rotor 52 has a plurality of magnets 62a arranged in the peripheral direction along an annular track encircling the stator 61. When the crankshaft 53 rotates, the magnets 62a are displaced relative to the coils 61a, and the ACG 58 thus generates electric power.

Another end of the crankshaft 53 projects to the outside from a right side surface of the crankcase 32. A cam driving mechanism 63 that transmits power to the cam shaft is coupled to the another end of the crankshaft 53. The cam driving mechanism 63 includes: a driving cam gear 63a coaxially fixed to the crankshaft 53; a driven cam gear (not depicted) fixed to the cam shaft; and a cam gear train 63b constituted of a plurality of gears that mesh with each other in order from the driving cam gear 63a to the driven cam gear and transmit power from the driving cam gear 63a to the driven cam gear. A cam driving mechanism cover 64 (as a component of engine main body) that houses the driving cam gear 63a between the cam driving mechanism cover 64 and the crankcase 32 is coupled to the right side surface of the crankcase 32. The ACG cover 59 and the cam driving mechanism cover 64 cover external surfaces of the crankcase 32 and demarcate a crank chamber 65 housing the crankshaft 53. The cam driving mechanism 63 may include a driving sprocket, a driven sprocket, and a cam chain in place of the driving cam gear 63a, the driven cam gear, and the cam gear train 63b.

A dog clutch type multistage transmission (hereinafter "transmission") 66 is incorporated in the internal combustion engine 31. The transmission 66 is housed in a transmission chamber 67 demarcated in the crank chamber 65. The transmission 66 includes a pair of transmission shafts, that is, a main shaft 68 and a counter shaft 69 having an axis parallel with the axis of the crankshaft 53. The main shaft 68 and the counter shaft 69 are rotatably supported by the crankcase 32 via rolling bearings 71a and 71b; 72a and 72b.

A speed change gear train 73 including a plurality of speed change gears is supported by the main shaft 68 and the counter shaft 69. The speed change gear train 73 is disposed between the bearings 71a and 71b; 72a and 72b, and is housed in the transmission chamber 67. The speed change gear train 73 includes: rotary gears 73a coaxially and relatively rotatably supported by the main shaft 68 or the counter shaft 69; fixed gears 73b that are relatively non-rotatably fixed to the main shaft 68, and mesh with corresponding rotary gears 73a; and shift gears 73c that are relatively non-rotatably and axially displaceably supported by the main shaft 68 or the counter shaft 69, and mesh with corresponding rotary gears 73a. Axial displacements of the rotary gears 73a and the fixed gears 73b are restricted. When a shift gear 73c is coupled to a rotary gear 73a through an axial displacement, relative rotation between the rotary gear 73a and the main shaft 68 or the counter shaft 69 is restricted. When the shift gear 73c meshes with a fixed gear 73b on the other shaft, a rotational power is transmitted between the main shaft 68 and the counter shaft 69. When the shift gear 73c is coupled to the rotary gear 73a that meshes with the fixed gear 73b on the other shaft, a rotational power is transmitted between the main shaft 68 and the counter shaft 69. When specific speed change gears thus mesh with each other between the main shaft 68 and the counter shaft 69, a rotational power is transmitted from the main shaft 68 to the counter shaft 69 at a specified reduction ratio.

Figure 5:
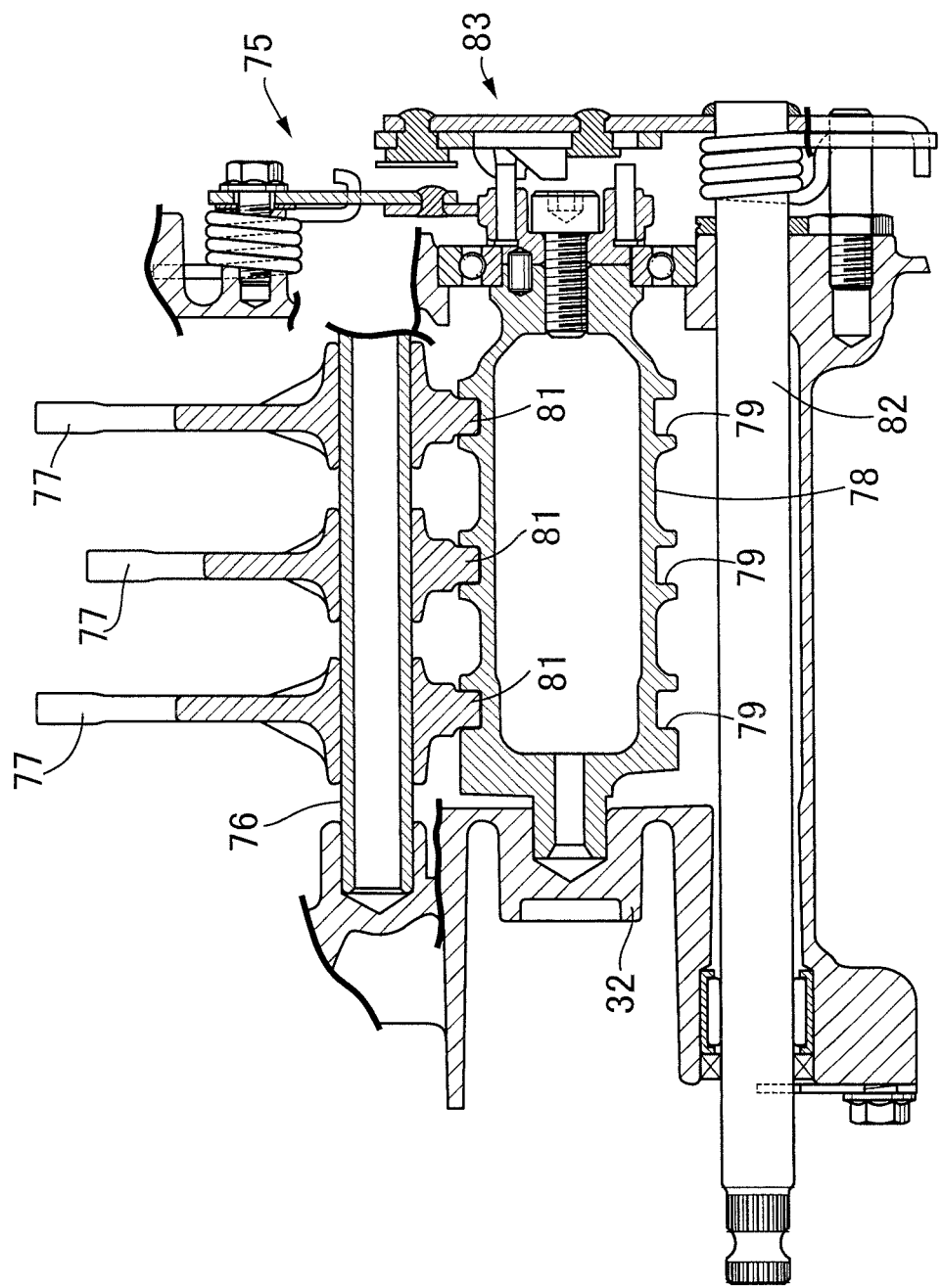
FIG. 5 is an enlarged rear view of a shift drum and a shift spindle.

As depicted in FIG. 5, a shift mechanism 75 is incorporated in the transmission 66. The shift mechanism 75 has a guiding shaft 76 extending in parallel with the axes of the transmission shafts 68 and 69. A plurality of shift forks 77 are supported by the guiding shaft 76 so as to be displaceable in an axial direction. Each shift fork 77 extends in a direction orthogonal to the axis of the guiding shaft 76, and is coupled to a shifter coupled to the corresponding shift gear 73c.

The shift mechanism 75 includes a shift drum 78. The shift drum 78 is rotatably supported about an axis extending in parallel with the axis of the guiding shaft 76. Cam grooves 79 are cut in the outer peripheral surface of the shift drum 78. The cam grooves 79 are shifted in the axial direction of the shift drum 78 according to a rotational angle. Pins 81 that project from the shift forks 77 in a direction orthogonal to the axis of the guiding shaft 76 are inserted in the cam grooves 79. The shift forks 77 thus move along the guiding shaft 76 according to rotation of the shift drum 78. The movements of the shift forks 77 cause movements of shifters on the transmission shafts 68 and 69.

The shift mechanism 75 includes a shift spindle 82 that rotates about an axis extending in parallel with the axis of rotation of the shift drum 78. One end of the shift spindle 82 projects to the outside of the crankcase 32. A transmission pedal (not depicted) is attached to the one end of the shift spindle 82. Another end of the shift spindle 82 is connected to the shift drum 78 by an interlocking mechanism 83. The shift spindle 82 rotates and causes a rotation of the shift drum 78 according to an operation of the transmission pedal.

As depicted in FIG. 4, one end of the main shaft 68 projects to the outside from the right side surface of the crankcase 32. The one end of the main shaft 68 relatively rotatably and coaxially supports, on the outside of the crankcase 32, a primary driven gear 85 meshing with a primary driving gear 84 of the crankshaft 53 and a one-way clutch gear 86 coupled to the primary driven gear 85. The primary driving gear 84 is, for example, formed integrally with the crank 56 of the crankshaft 53. The one-way clutch gear 86 provides a rotational force to the primary driven gear 85 when rotating in one direction according to an external force acting from gear teeth, and rotates relative to the primary driven gear 85 and maintains a stationary state on the main shaft 68 when the primary driven gear 85 rotates according to a driving force from the crankshaft 53.

A friction clutch 87 is coupled to the primary driven gear 85 on the main shaft 68. A clutch cover 88 (as a component of engine main body) that houses the friction clutch 87 between the clutch cover 88 and the crankcase 32 is coupled to the right side surface of the crankcase 32. The friction clutch 87 includes a clutch outer 87a and a clutch hub 87b. The primary driven gear 85 is coupled to the clutch outer 87a. The friction clutch 87 switches between connection and disconnection between the clutch outer 87a and the clutch hub 87b according to an operation of a clutch lever.

A driving sprocket 89a of a power transmitting device 89 disposed on the outside of the crankcase 32 is coupled to the counter shaft 69. A driving chain 89b is wound around the driving sprocket 89a. The driving chain 89b transmits rotational power of the driving sprocket 89a to the rear wheel WR.

As depicted in FIG. 3, the crankcase 32 has an upper wall 92 that covers the main shaft 68 while bulging along an imaginary cylindrical surface coaxial with the main shaft 68, and forms the valley-shaped space 91 between the crankcase 32 and the cylinder block 33. Formed as an inner surface of the upper wall 92 in the transmission chamber 67 are a ceiling surface 93a that is faced to an outer edge of the speed change gear train 73 and extends along a horizontal plane and a curved surface 93b that is continuous frontward from the ceiling surface 93a and extends downward while curved along the outer edge of the speed change gear train 73. The starter motor 46 is disposed in front of the speed change gear train 73 of the main shaft 68, and is disposed in the valley-shaped space 91.

The starter motor 46 includes a cylindrical-shaped casing 46a having a central axis parallel with the rotation axis Rx. The casing 46a houses therewithin a rotor coupled to a driving shaft having an axis on the central axis and a stator surrounding the rotor. The casing 46a has a pair of front and rear flanges 94 that project to the outside in a horizontal direction from the external surface of the cylindrical shape. The flanges 94 are fixed to the crankcase 32 by a bolt member having an axis parallel with the central axis.

A rotational speed sensor 95 that faces the transmission chamber 67 from the ceiling surface 93a is attached to the upper wall 92 of the crankcase 32. A detecting end of the rotational speed sensor 95 is, for example, faced to the outer edge of a rotary gear 73a having a maximum diameter on the main shaft 68. The rotational speed sensor 95 detects the rotational speed of the counter shaft 69.

Figure 6:
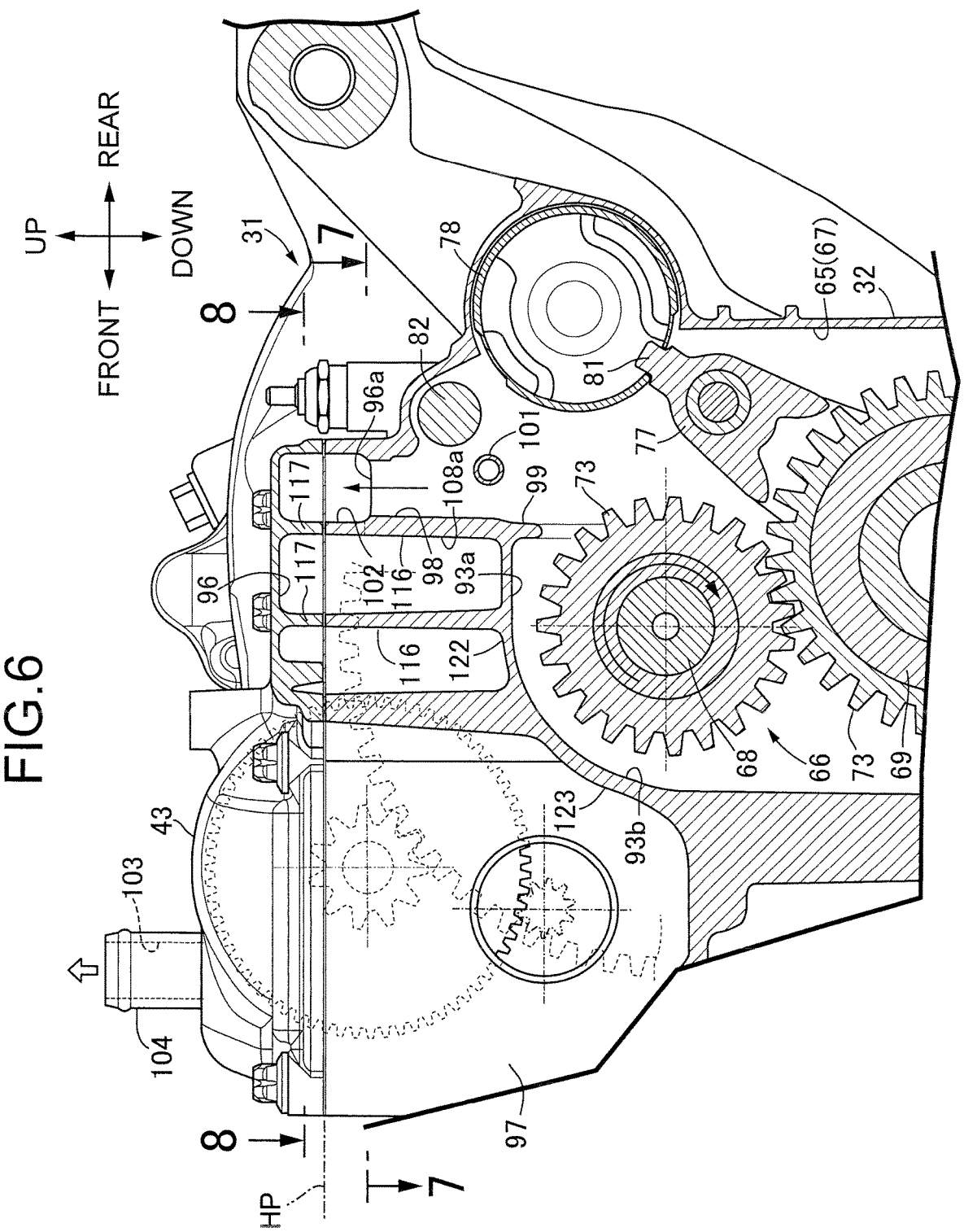
FIG. 6 is an enlarged vertical sectional view of a breather chamber.

The crankcase 32, the cylinder block 33, the cylinder head 34, and the head cover 35 as well as the breather cover 43, the ACG cover 59, the cam driving mechanism cover 64, and the clutch cover 88 coupled to the crankcase 32 cooperatively form an engine main body. As depicted in FIG. 6, the engine main body demarcates the breather chamber 96 partitioned from the crank chamber 65 and disposed above the crank chamber 65 (transmission chamber 67). The crankcase 32 has a wall 97 formed therein that rises upward from the external surface of the crankcase 32, has an upper end partitioned by a horizontal plane HP, and encloses the breather chamber 96.

The breather chamber 96 has an inlet opening 96a disposed above a lower half, in a height direction, of the breather chamber 96 and opening toward the crank chamber 65 (transmission chamber 67). Connected to the breather chamber 96 is a breather passage 98 that is disposed above the main shaft (transmission shaft) 68 and extends in an up-down direction from the crank chamber 65 (transmission chamber 67) toward the inlet opening 96a of the breather chamber 96. The breather passage 98 is disposed on the outside of a downstream end of the ceiling surface 93a in a rotational direction of the speed change gear train 73 supported by the main shaft 68. The crankcase 32 has a projecting piece 99 formed thereon which projects downward from the downstream end of the ceiling surface 93a and has a tip end facing the speed change gear train 73 on the main shaft 68.

The shift spindle 82 and an oil passage pipe 101 extending in parallel with the axis of the main shaft 68 are faced to a lower end of the breather passage 98. The oil passage pipe 101 feeds oil from one side wall to another side wall of the crankcase 32, the oil being drawn up from an oil pan coupled to a lower part of the crankcase 32 by the action of an oil pump.

The breather cover 43 has a pipe body 104 formed thereon that demarcates an outlet end 103 located forwardly of a connecting end 102 connected to the breather passage 98. The breather hose 44 is coupled to the pipe body 104.

Figure 7:
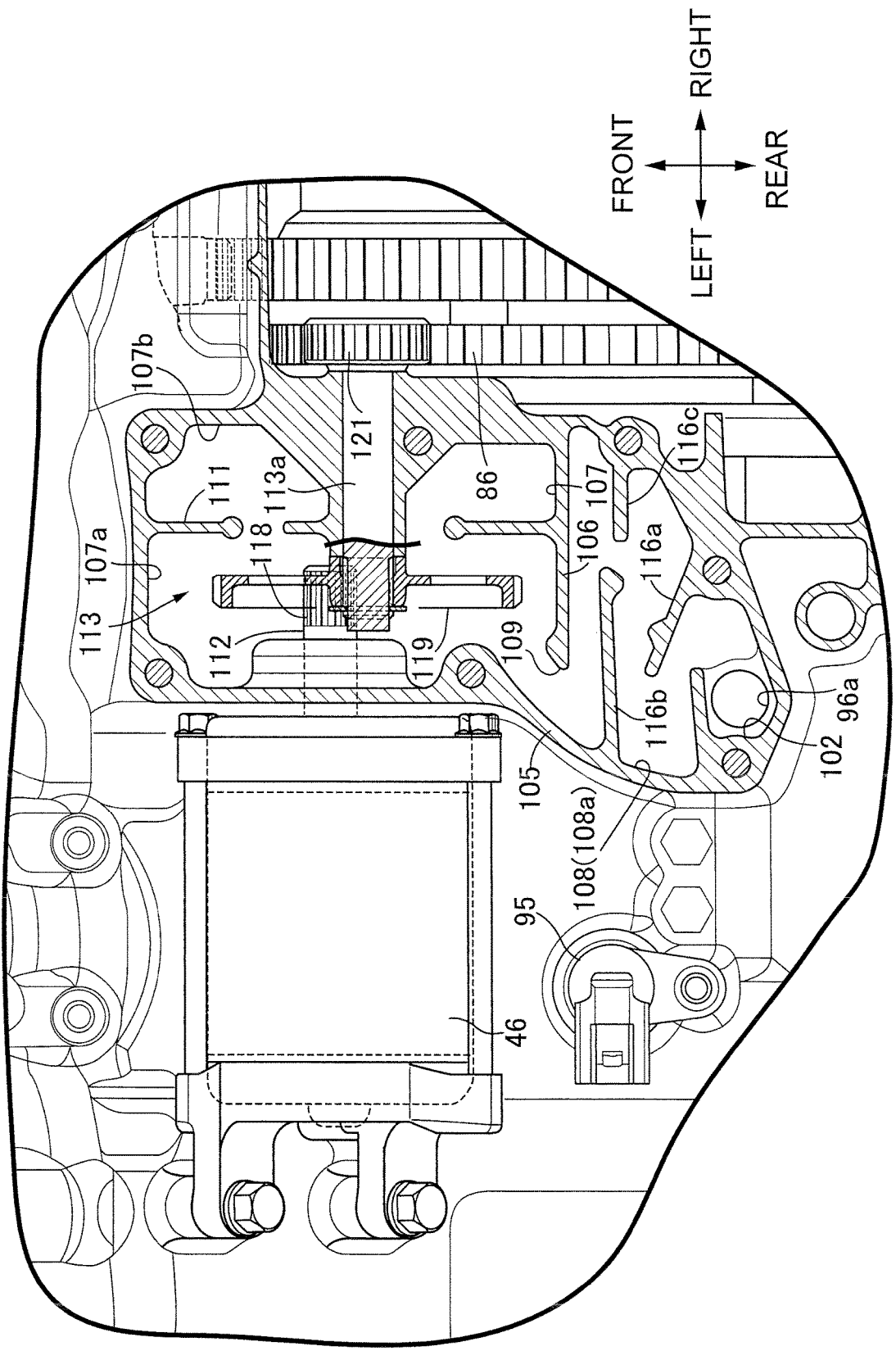
FIG. 7 is an enlarged horizontal sectional view taken along a line 7-7 of FIG. 6.

As depicted in FIG. 7, the breather chamber 96 extends forward, along a plane orthogonal to the rotation axis Rx of the crankshaft 53, from the connecting end 102 connected to the breather passage 98 toward the cylinder head 34 disposed below the air cleaner 39. A space surrounded by a wall 105 of the crankcase 32 is divided into a front space 107 and a rear space 108 by a first partition wall 106 that rises upward from the external surface of the crankcase 32 and has an upper end partitioned by a horizontal plane. The front space 107 and the rear space 108 are connected to each other through a gap 109 of the first partition wall 106.

Figure 8:
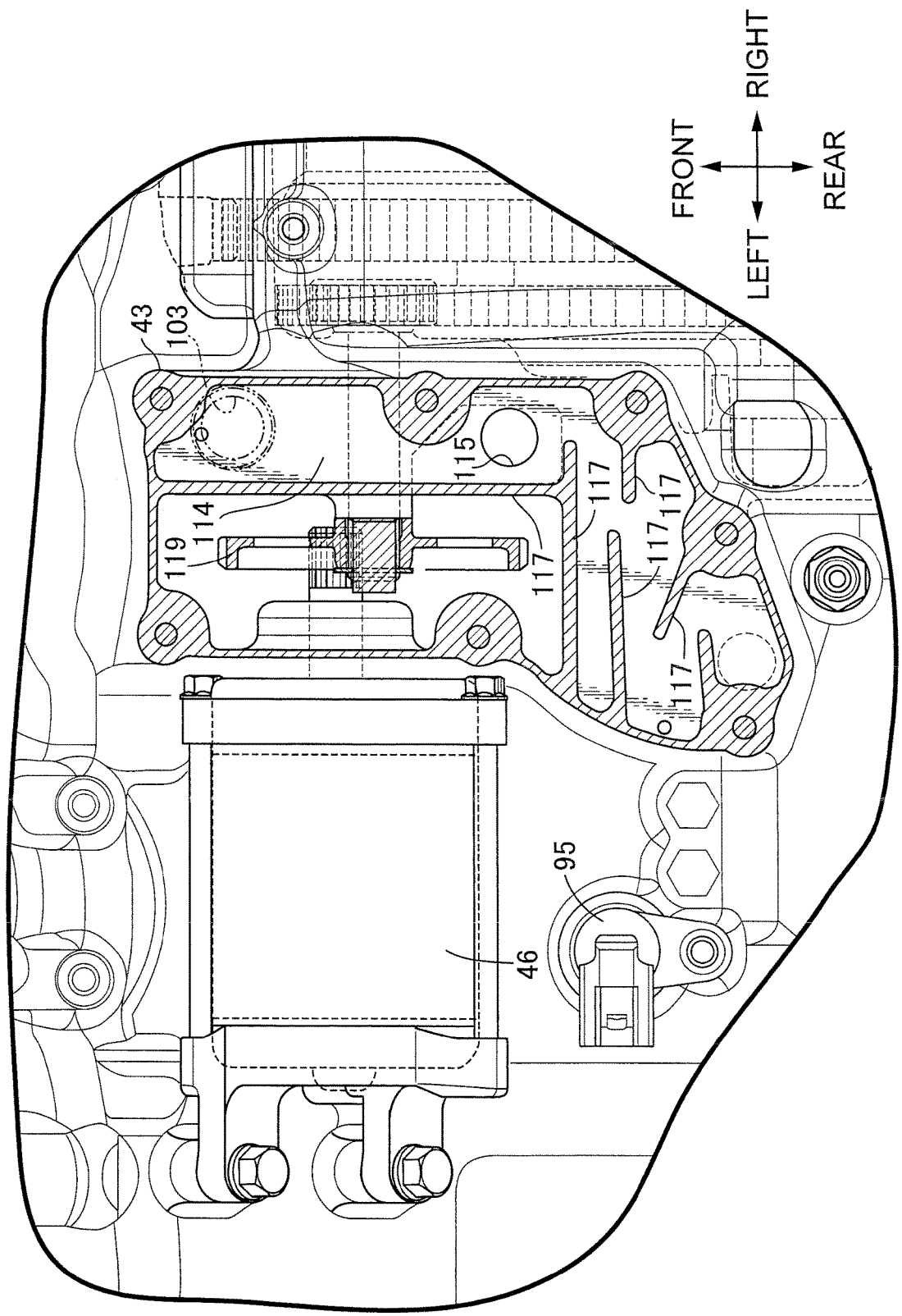
FIG. 8 is an enlarged horizontal sectional view taken along a line 8-8 of FIG. 6.

The front space 107 is divided into a gear chamber 107a and an auxiliary chamber 107b, by a second partition wall 111 extending along an imaginary plane orthogonal to the axis of rotation of the main shaft 68 and partitioned by a horizontal plane, the gear chamber 107a housing one gear of reduction gear 113 transmitting power from the driving shaft 112 of the starter motor 46 to the one-way clutch gear 86, and the auxiliary chamber 107b being adjacent to the gear chamber 107a in the axial direction of the crankshaft 53. As depicted in FIG. 8, the auxiliary chamber 107b is closed by a gasket 114 installed on upper ends of the wall 105, the first partition wall 106, and the second partition wall 111 and sandwiched between the crankcase 32 and the breather cover 43. The gasket 114 has a vent hole 115 formed therein in the rear of the outlet end 103, the vent hole 115 connecting the auxiliary chamber 107b to a space sandwiched between the gasket 114 and the breather cover 43.

The rear space 108 is closed by the gasket 114. As depicted in FIG. 7, the rear space 108 forms a labyrinth chamber 108a functioning as a passage of breathing air reaching the gear chamber 107a from the breather passage 98. In the labyrinth chamber 108a, as depicted in FIG. 6, the passage is partitioned in the form of a labyrinth by a rib 116 that rises upward from the crankcase 32 and partitioned by the horizontal plane HP. As depicted in FIG. 7, the rib 116 includes: a first rib 116a that extends leftward from the wall 105 surrounding the connecting end 102 in a left-right central position, and demarcates a flow passage connected to the connecting end 102 and extending leftward between the first rib 116a and the wall 105; a second rib 116b that extends rightward from the wall 105 on the outlet end 103 side of the first rib 116a, and demarcates a rightward flow passage between the second rib 116b and the first rib 116a; a third rib 116c that extends leftward from the wall 105 on an extension of the second rib 116b, and demarcates a dead end extending in series with the flow passage formed by the second rib 116b. The second rib 116b and the third rib 116c demarcate, between the second rib 116b and the third rib 116c and the first partition wall 106, a flow passage extending leftward from the flow passage formed by the second rib 116b and reaching the gap 109.

As depicted in FIG. 6 and FIG. 8, the breather cover 43 has a downward rib 117 formed thereon which extends downward and sandwiches the gasket 114 between the downward rib 117 and the first partition wall 105, the second partition wall 111, and the rib 116 of the labyrinth chamber 108a. The gear chamber 107a and the labyrinth chamber 108a are covered by the breather cover 43 from above.

As depicted in FIG. 7, the reduction gear 113 includes a shaft body 113a supported by the crankcase 32 so as to be rotatable about a rotation axis. A large-diameter gear 119 meshing with a driving gear 118 of the starter motor 46 within the gear chamber 107b is disposed on one end of the shaft body 113a coaxially with the shaft body 113a. The driving gear 118 is, for example, cut on the driving shaft 112 of the starter motor 46. A small-diameter gear 121 meshing with the one-way clutch gear 86 on the outside of the crankcase 32 is disposed on another end of the shaft body 113a coaxially with the shaft body 113a.

A rotation of the driving shaft 112 is reduced in speed by the reduction gear 113, and then transmitted to the one-way clutch gear 86. The starter motor 46 generates a driving force that forcibly rotates the crankshaft 53. The rotational speed sensor 95 is disposed at a position separated from the labyrinth chamber 108a in the axial direction of the main shaft 68.

As depicted in FIG. 6, the crankcase 32 includes: a first partition wall 122 that extends along the horizontal plane HP in a position facing the outer edge of the speed change gear train 73 on the main shaft 68, and separates the labyrinth chamber 108a from the crank chamber 65; and a second partition wall 123 that is continuous from the first partition wall 122 and extends downward while curved along the outer edge of the speed change gear train 73, and separates the gear chamber 107a from the crank chamber 65. The ceiling surface 93a is defined as the inner surface of the first partition wall 122. The curved surface 93b is defined as the inner surface of the second partition wall 123. The curved surface 93b is continuous with an upstream end of the ceiling surface 93a.

The operation of the present embodiment will next be described. During operation of the internal combustion engine 31, breathing air is introduced into the breather chamber 96 from the inlet opening 96a through the breather passage 98 according to pressure variations within the crank chamber 65. At this time, the breathing air is introduced into the breather chamber 96 from the inlet opening 96a in a position sufficiently separated from the main shaft 68 and the counter shaft 69, and therefore gas-liquid separation is promoted. The breather chamber 96 is disposed above the transmission 66, and therefore does not protrude in the horizontal direction, so that a compact internal combustion engine 31 is realized. The avoidance of such a protrusion can contribute to concentration of a mass toward the center of the internal combustion engine 31.

In the present embodiment, the breather chamber 96 extends frontward, along a plane orthogonal to the rotation axis Rx of the crankshaft 53, from the connecting end 102 connected to the breather passage 98 toward the cylinder head 34 disposed below the air cleaner 39, and is connected to the air cleaner 39 by the breather hose 44 coupled to the outlet end 103 located forwardly of the connecting end 102. Hence, a long path of the breathing air is secured, and the breather hose 44 is shortened because the outlet end 103 of the breather chamber 96 is close to the air cleaner 39.

In the internal combustion engine 31 according to the present embodiment, the crankcase 32 includes: the ceiling surface 93a that is faced to the outer edge of the speed change gear train 73 on the main shaft 68 and extends along the horizontal plane HP, the lower end of the breather passage 98 being disposed on the outside of one end of the ceiling surface 93a; and the curved surface 93b that is continuous from another end of the ceiling surface 93a, and extends downward while curved along the outer edge of the speed change gear train 73. The breathing air rises along the curved surface 93b, and flows from the ceiling surface 93a to the breather passage 98. Thus, the speed change gear train 73 can efficiently scrape down splashed oil in the breathing air, so that gas-liquid separation is further promoted.

The crankcase 32 has the projecting piece formed thereon which projects downward from the downstream end of the ceiling surface 93a in the rotational direction of the speed change gear train 73. The splashed oil scattered from the speed change gear train 73 during rotation of the speed change gear train 73 is obstructed by the projecting piece 99. The entry of the splashed oil into the breather passage 98 is therefore prevented.

In the internal combustion engine 31 according to the present embodiment, the shift spindle 82 extends in parallel with the rotation axis of the shift drum 78, and is faced to the lower end of the breather passage 98. Because the shift spindle 82 is faced to the lower end of the breather passage 98, the entry of the splashed oil into the breather passage 98 is prevented.

The internal combustion engine 31 according to the present embodiment incorporates the oil passage pipe 101 extending in parallel with the axis of the main shaft 68 and faced to the lower end of the breather passage 98. Because the oil passage pipe 101 is faced to the lower end of the breather passage 98, the entry of the splashed oil into the breather passage 98 is prevented.

The reduction gear 113 of the starter motor 46 is disposed in the breather chamber 96. The splashed oil is scraped down by the reduction gear 113 within the breather chamber 96. Thus, gas-liquid separation is promoted, and the reduction gear 113 is moderately lubricated by the action of the splashed oil.

In addition, the gear chamber 107a housing the reduction gear 113 and the labyrinth chamber 108a partitioning, in the form of a labyrinth by the rib 116, the passage of the breathing air reaching the gear chamber 107a from the breather passage 98 are demarcated in the breather chamber 96. On the basis of the action of the labyrinth chamber 108a, gas-liquid separation is promoted within the passage reaching the gear chamber 107a, and the splashed oil passing through the labyrinth chamber 108a moderately lubricates the reduction gear 113 within the gear chamber 107a.

The crankcase 32 includes the first partition wall 122 extending along the horizontal plane HP in a position faced to the outer edge of the speed change gear train 73 on the main shaft 68, and separating the labyrinth chamber 108a from the crank chamber 65, and the second partition wall 123 continuous from the first partition wall 122, extending downward while curved along the outer edge of the speed change gear train 73, and separating the gear chamber 107a from the crank chamber 65. The gear chamber 107a is separated from the crank chamber 65 by the second partition wall 123 extending downward while curved. Thus, the gear chamber 107a can be disposed in a lower part than the labyrinth chamber 108a, and a large space is secured for the gear chamber 107a while upward bulging of the gear chamber 107a is suppressed.

The breather cover 43 covering the gear chamber 107a and the labyrinth chamber 108a from above is coupled to the crankcase 32 according to the present embodiment. A lid member for the reduction gear 113 functions as a lid member for the whole of the breather chamber 96. The number of parts is therefore reduced.

The rotational speed sensor 95 that detects the rotational speed of the main shaft 68 is attached to the crankcase 32 at a position separated from the labyrinth chamber 108a in the axial direction of the main shaft 68 and the counter shaft 69.

Because the labyrinth chamber 108a and the rotational speed sensor 95 are arranged in the axial direction of the transmission shafts 68 and 69, space saving above the crankcase 32 is realized.

In the present embodiment, the breather passage 98 is formed by a side wall of the breather chamber 96. The breather chamber 96 communicates with the atmosphere. Thus, the temperature of the wall surface of the breather chamber 96 becomes lower than the inside of the crankcase 32, so that the breathing air adhering to the side wall of the breather chamber 96 liquefies easily.

What is claimed is:

1. An internal combustion engine comprising:
   an engine main body demarcating a crank chamber and a breather chamber, the crank chamber housing a crankshaft and the breather chamber being partitioned from the crank chamber, disposed above the crank chamber and having an inlet opening opening toward the crank chamber;
   a multistage transmission housed in the crank chamber and having speed change gear trains that are respectively supported by a pair of transmission shafts and mesh with each other; and
   a breather passage disposed above the transmission shaft and extending in an up-down direction from the crank chamber to the inlet opening of the breather chamber, the inlet opening being disposed above a lower half, in a height direction, of the breather chamber,
   wherein a reduction gear of a starter motor is disposed in the breather chamber.

2. The internal combustion engine according to claim 1, wherein the breather chamber extends frontward, along a plane orthogonal to a rotation axis of the crankshaft, from a connecting end connected to the breather passage toward a cylinder head disposed below an air cleaner, and is connected to the air cleaner by a breather hose coupled to an outlet end located forwardly of the connecting end.

3. The internal combustion engine according to claim 1, wherein the engine main body includes:
   a ceiling surface that is faced to an outer edge of the speed change gear trains and extends along a horizontal plane, the breather passage being disposed on an outside of one end of the ceiling surface;
   and a curved surface that is continuous from another end of the ceiling surface and extends downward while curved along the outer edge of the speed change gear trains.

4. The internal combustion engine according to claim 3, wherein the engine main body includes a projecting piece projecting downward from a downstream end of the ceiling surface in a rotational direction of the speed change gear trains.

5. The internal combustion engine according to claim 1, further comprising:
   a shift spindle extending in parallel with a rotation axis of a shift drum and faced to the breather passage.

6. The internal combustion engine according to claim 1, further comprising:
   an oil passage pipe extending in parallel with axes of the transmission shafts and faced to the breather passage.

7. The internal combustion engine according to claim 1, wherein a gear chamber and a labyrinth chamber are demarcated in the breather chamber, the gear chamber housing the reduction gear, and the labyrinth chamber partitioning, in a form of a labyrinth by a rib, a passage of breathing air reaching the gear chamber from the breather passage.

8. The internal combustion engine according to claim 7, wherein the engine main body includes a crankcase having:
- a first partition wall extending along a horizontal plane in a position faced to the outer edge of the speed change gear trains, the first partition wall separating the labyrinth chamber from the crank chamber; and
- a second partition wall continuous from the first partition wall and extending downward while curved along the outer edge of the speed change gear trains, the second partition wall separating the gear chamber from the crank chamber.

9. The internal combustion engine according to claim 8, wherein a lid member covering the gear chamber and the labyrinth chamber from above is coupled to the crankcase.

10. The internal combustion engine according to claim 8, wherein a rotational speed sensor that detects rotational speed of the transmission shaft is attached to the crankcase at a position separated from the labyrinth chamber in an axial direction of the transmission shaft.

11. The internal combustion engine according to claim 1, wherein the breather passage is formed by a side wall of the breather chamber.

\* \* \* \* \*